United States Patent [19]
Kaneko et al.

[11] Patent Number: 4,558,215
[45] Date of Patent: Dec. 10, 1985

[54] OBJECT DETECTING APPARATUS

[75] Inventors: Makoto Kaneko; Susumu Tachi; Kiyoshi Komoriya, all of Ibaraki, Japan

[73] Assignees: Agency of Industrial Science and Technology; Ministry of International Trade and Industry, both of Tokyo, Japan

[21] Appl. No.: 464,914

[22] Filed: Feb. 8, 1983

[30] Foreign Application Priority Data

Mar. 30, 1982 [JP] Japan .................................. 57-51580

[51] Int. Cl.[4] ............................................. G01B 11/24
[52] U.S. Cl. ................................. 250/222.1; 250/224; 350/6.5; 356/376
[58] Field of Search ................. 250/221, 222.1, 203 R, 250/236, 224; 340/555-557; 356/1, 4, 376; 350/6.5, 6.9

[56] References Cited

U.S. PATENT DOCUMENTS

| | | | |
|---|---|---|---|
| 3,072,798 | 1/1963 | Sick | 250/236 |
| 3,091,699 | 5/1963 | Hammar | 250/236 |
| 3,476,946 | 11/1969 | Kepner | 340/555 |
| 4,059,758 | 11/1977 | Wilwerding | 356/4 |
| 4,306,147 | 12/1981 | Fukuyama et al. | 250/221 |
| 4,413,180 | 11/1983 | Libby | 250/236 |
| 4,427,880 | 1/1984 | Kanade et al. | 250/222.1 |

Primary Examiner—John K. Corbin
Assistant Examiner—R. Eyssallene
Attorney, Agent, or Firm—Schwartz & Weinrieb

[57] ABSTRACT

Object detecting apparatus for use, for example, upon a mobile robot to detect objects or obstacles such that the robot may navigate clear of such objects or obstacles includes a source of light for projecting a light beam (7) convergingly toward an axis (9) so as to intersect the axis. The light beam (7) is rotated about the axis (9) within a circular locus (10) while the predetermined converging angle of the beam (7) is maintained constant with respect to the axis (9) so as to generate a light beam detecting surface (8). A condensing lens (2) and light detector (3) are coaxially disposed upon the axis (9) along with the circular locus (10) of the light beam (7) so as to define a viewing field or volume (5). An object-to-be-detected (6) may therefore be detected when the same is illuminated by the projected light beam (7) and its envelope surface (8), and the light reflected from the object (6) is transmitted back to the lens (2) and light detector (3). In a first embodiment of the invention, the light source (4) may itself be rotated about the axis (9) within the circular locus (10) or alternatively, in a second embodiment, the light source (4) may be fixed but have its light beam transmitted to an axially disposed mirror (12) and a peripherally disposed mirror (13) which are rotated within the circular locus (10).

20 Claims, 18 Drawing Figures

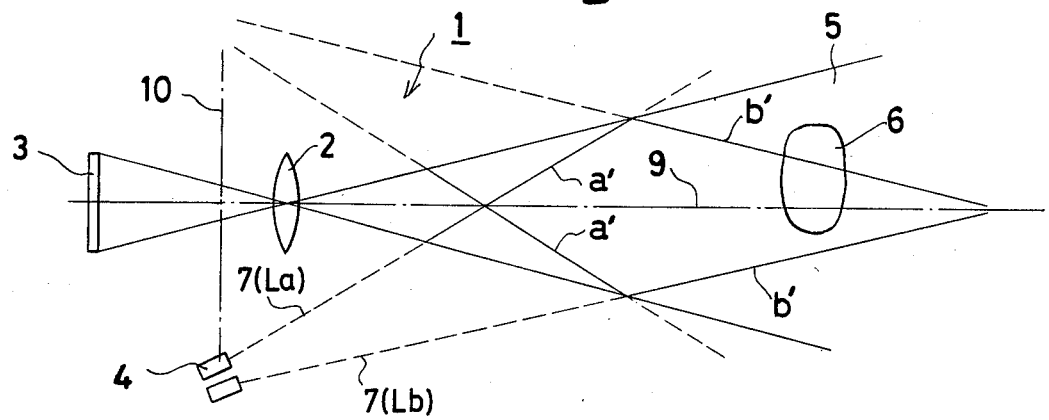
Fig_1
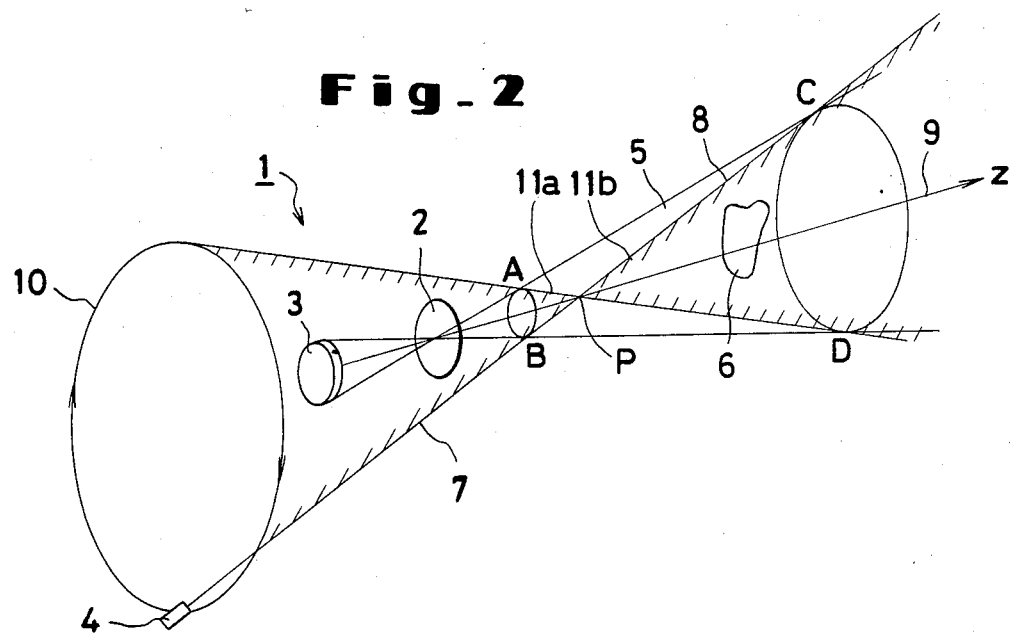
Fig_2
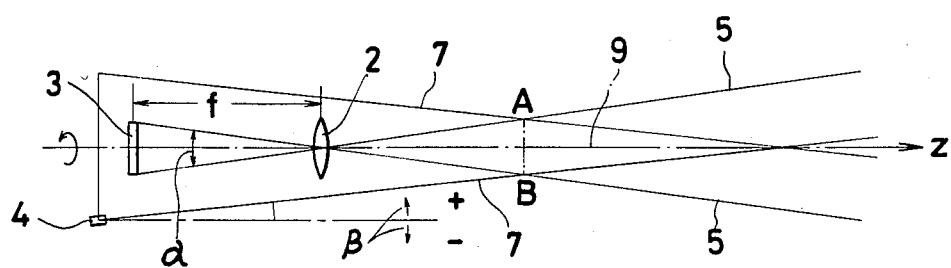
Fig_3 (A)

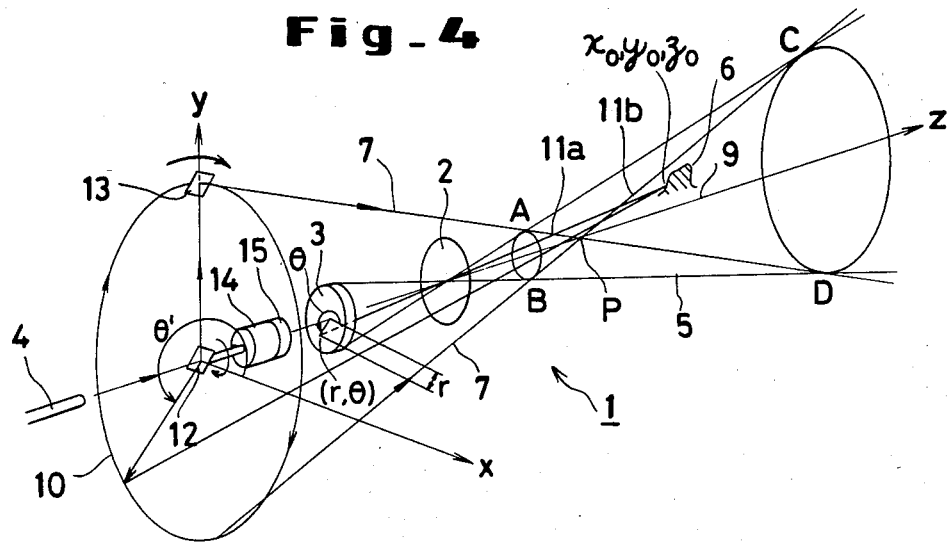
Fig_4
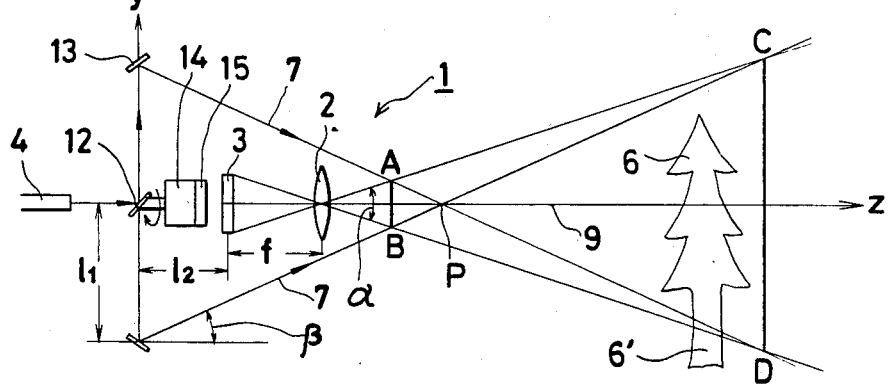
Fig_5

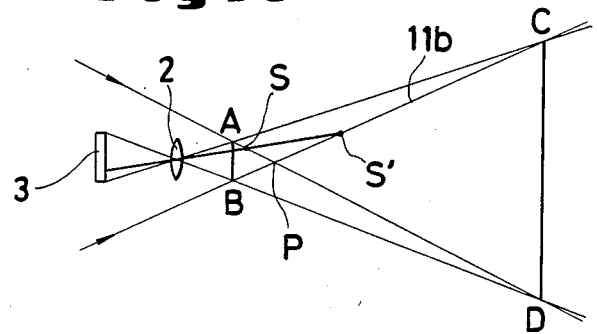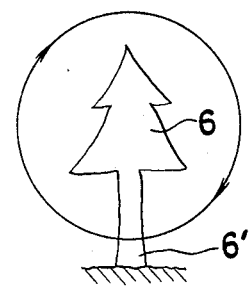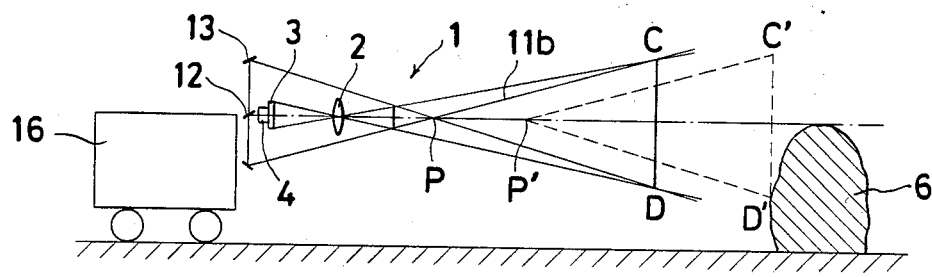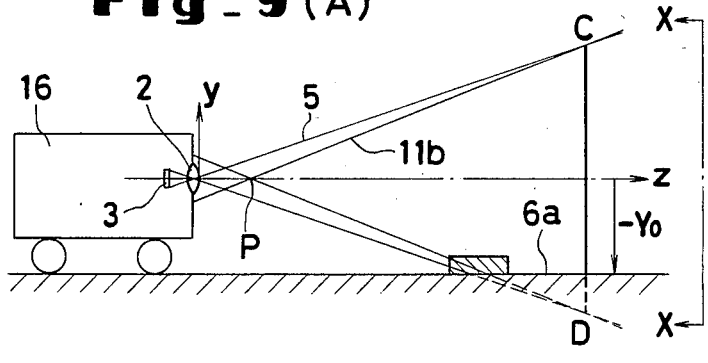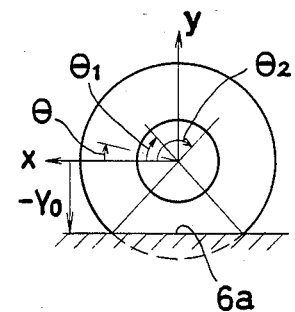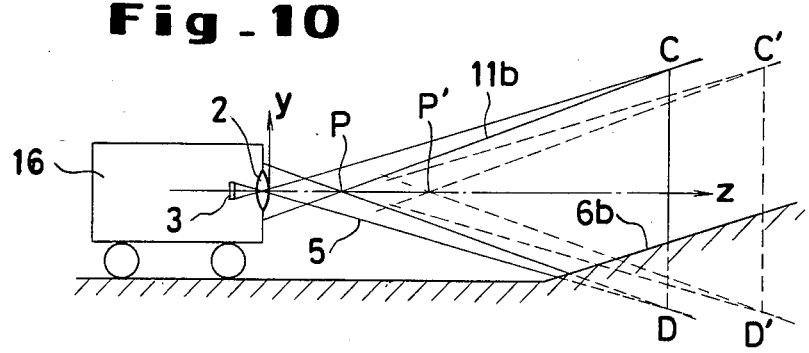

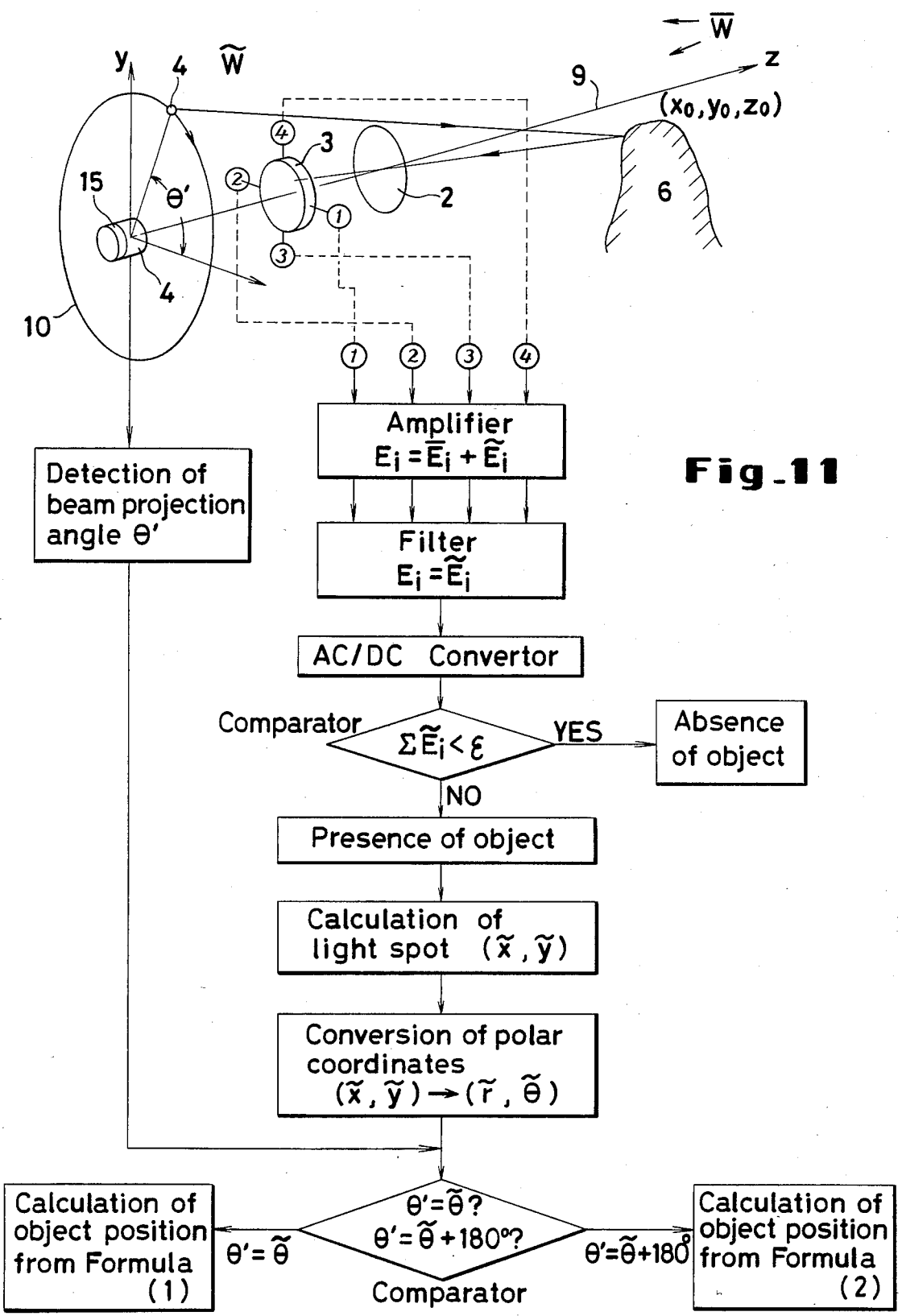
Fig_11

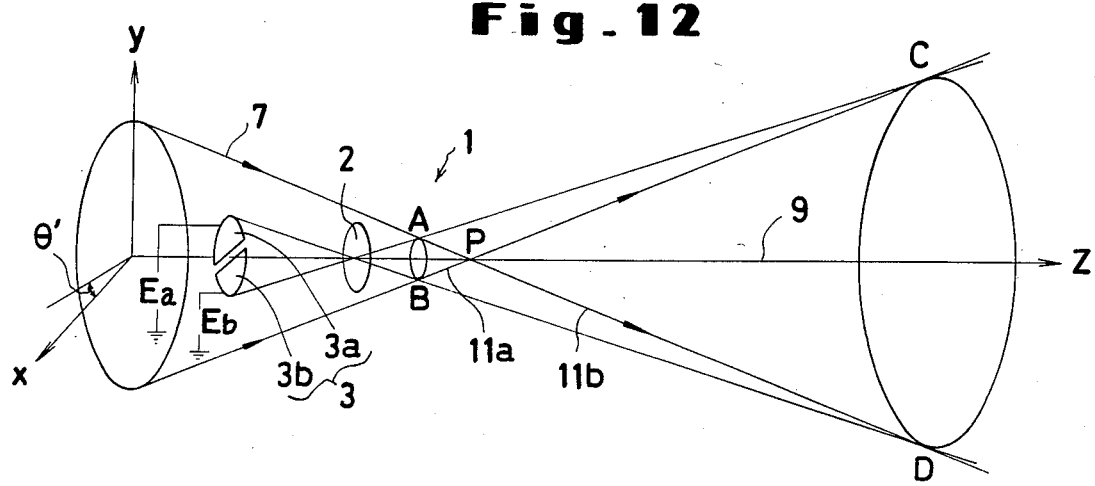
Fig_12
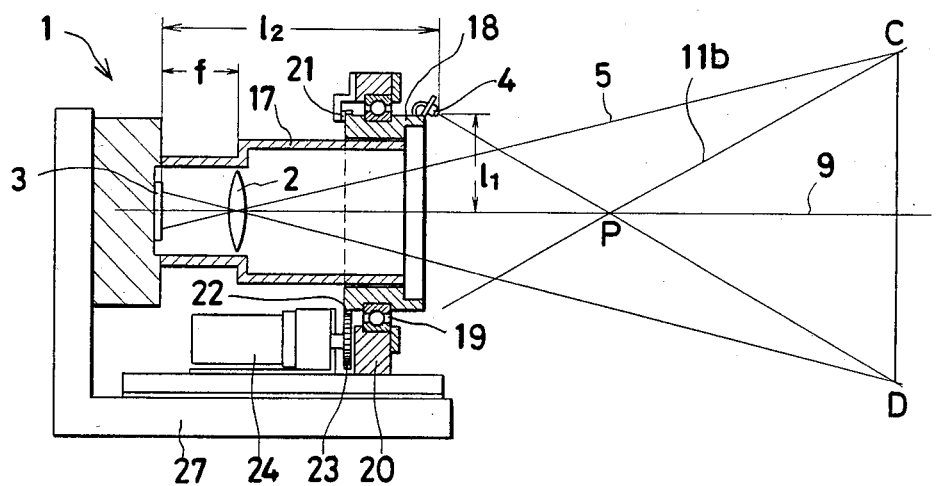
Fig_13
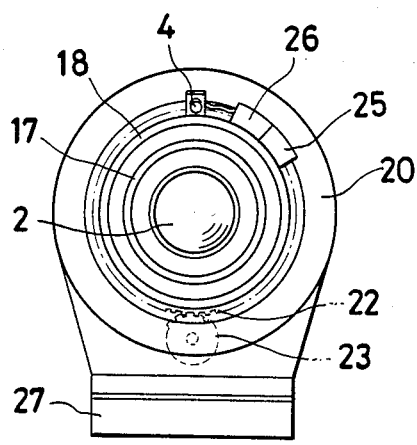
Fig_14

OBJECT DETECTING APPARATUS

FIELD OF THE INVENTION

This invention relates to an object detecting apparatus to be used for the purpose of enabling moving machines such as mobile robots to detect obstacles standing in the paths of their locomotion.

BACKGROUND OF THE INVENTION

For mobile robots, it is ideal that they should be capable of accurately recognizing obstacles of varying sizes and abrupt changes in ground level by visual systems of their own and consequently moving around selectively in zones of confirmed safety.

The methods adopted in mobile robots for the detection of obstacles in the paths of their locomotion are broadly divided into passive methods and active methods. Among the passive methods is counted, for example, a method which effects the detection of obstacles by receiving external information as with an ITV camera. Since this method takes time to perform the recognition process, it is not suitable for mobile robots which are required to effect the detection of obtstacles in real time. Among the active methods are included an ultrasonic measurement method and an infrared projecting method. These methods share the salient advantage that they are capable of internally producing special signals rarely occurring naturally in the external environment and transmitting or projecting these signals into the external environment. The ultrasonic measurement method, owing to its operating principle, is suitable for detecting the presence or absence of obstacles and, if they are present, determining their average positions but is unsuitable for discerning the shapes of such obstacles. By the method employing projection of an infrared ray, although the positions and shapes of obstacles may be discerned with fairly high accuracy by using an infrared ray of a sufficiently small beam diameter and scanning a definite area in the path lying ahead, the scanning operation consumes time and the processing of received signals is complicated. In the circumstances, development of an object detecting apparatus which is capable of easily and accurately detecting the presence or absence of objects and the positions of such objects has been in demand.

OBJECT OF THE INVENTION

The object of this invention is to provide an object detecting apparatus which is capable of easily and accurately detecting the presence or absence of objects and the positions of such objects.

SUMMARY OF THE INVENTION

The foregoing and other objectives of the present invention are achieved through the provision of an object detecting system which includes a source of light which has its light beam directed at a predetermined angle with respect to an axis such that the beam of light intersects the axis. The axis passes through a spatial region within which an object-to-be-detected may be disposed, and the beam of light is rotated about the axis while the predetermined angle of the light beam is maintained with respect to the axis. In this manner, a conical detecting surface is generated within the spatial region within which an object-to-be-detected may be disposed. An optical system is coaxially disposed with respect to the rotating light source upstream of the spatial area within which the object-to-be-detected may be disposed, for receiving light reflected from the object-to-be-detected, whereby the object to be detected may in fact be detected. The rotating light source may actually comprise an original light source mounted upon a rotating system, or alternatively, may comprise a fixed source of light which may have its light beam projected onto a system of rotating mirrors. The object detecting system is particularly applicable to mobile robots in order to permit such robots to determine the presence or existence of such objects and thereby navigate around such objects or obstacles without encountering such objects or obstacles which would otherwise tend to destroy the robot.

BRIEF DESCRIPTION OF THE DRAWINGS

The other objects and the other characteristics of the present invention will become apparent from the further disclosure of this invention to be made hereinbelow with reference to the accompanying drawings, wherein:

FIG. 1 is an explanatory view illustrating the relation between the viewing volume and the detecting surface in the object detecting apparatus according to the present invention.

FIG. 2 is a perspective view of the explanatory view of FIG. 1.

FIG. 4 is a perspective explanatory view illustrating a first embodiment of the object detecting apparatus according to the present invention.

FIG. 5 is a side view of the object detecting apparatus illustrated in FIG. 4.

FIG. 6 is an explanatory view illustrating the relation between the position of an object under detection and the light detecting device in the object detecting apparatus of FIG. 4.

FIG. 7 is an explanatory view illustrating the basic concept of the recognition of the object under detection.

FIG. 8 is an explanatory view illustrating the condition in which the object detecting apparatus of FIG. 4 is mounted on a robot.

FIGS. 9(A) and 9(B) are explanatory views illustrating the manner in which the object detecting apparatus according to this invention detects an abrupt change in the ground level.

FIG. 10 is an explanatory view illustrating the manner in which the object detecting apparatus according to the present invention detects the inclination of a path.

FIG. 11 is a flow chart illustrating the procedure in which the object detecting apparatus according to the present invention detects the object under detection.

FIG. 12 is a perspective explanatory view illustrating a second embodiment of the object detecting apparatus according to the present invention.

FIG. 13 is a side view illustrating a third embodiment of the object detecting apparatus according to the present invention.

FIG. 14 is a front view of the object detecting apparatus illustrated in FIG. 13.

DESCRIPTION OF PREFERRED EMBODIMENT

Figure 3:
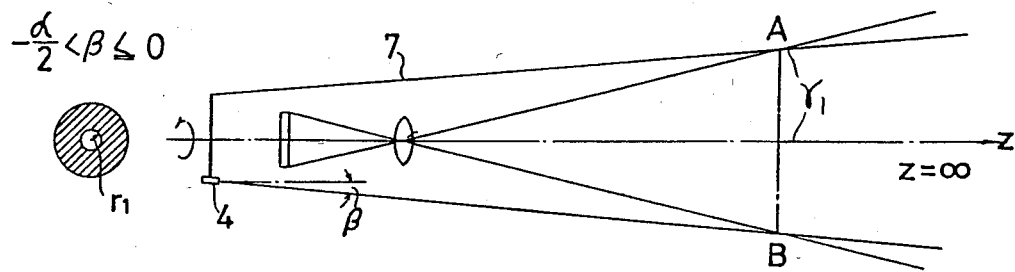
FIGS. 3(A), 3(B), 3(C), and 3(D) are explanatory views illustrating a method for the projection of a beam.
Figure 3:
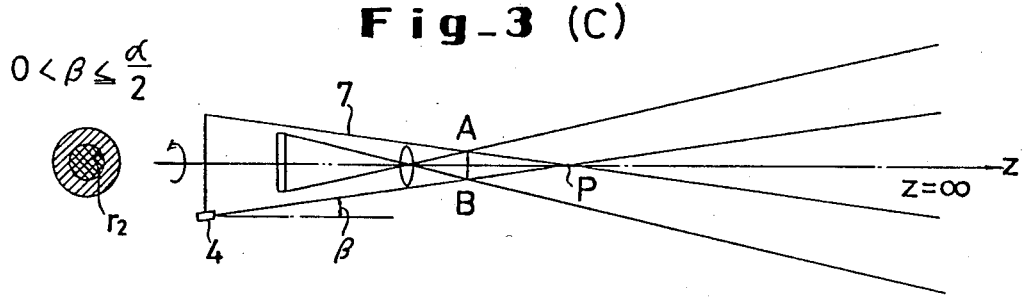
Figure 3:
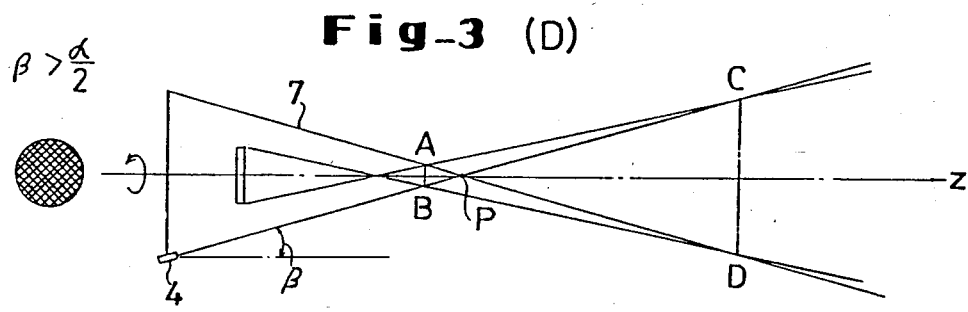

Referring now to the drawings and more particularly to FIGS. 1 and 2 thereof, an object detecting apparatus 1 of the present invention, in its fundamental construction, comprises an optical system 2 such as a lens, a light detecting device 3 disposed at the focal position of the aforementioned optical system 2, a light source 4, and means for moving the beam from the aforementioned light source 4 in a closed curve. The light detecting device 3 functions as a two-dimensional position detector. A position sensing device or a solar battery may be used as such a light detecting device. The size of this light detecting device determines a viewing volume 5, or solid angle defined by a cone having the diameter CD and its apex within the plane of lens 2. The term "viewing volume" as used herein refers to the region in which the beam from the light source 4 to be reflected by any object in its path, and then led through the optical system 2 would impinge upon the light detecting device 3. In short, this term means the region in which the light detecting device 3 is capable of optically detecting the object 6.

As the light source, a semiconductor laser or light-emitting diode of enhanced directivity can be used. For the purpose of elevating the accuracy of detection, a spot light source using a condensed laser beam proves advantageous.

The means for moving the beam issuing from the aforementioned light source along the closed curve may be either a device which moves the light source itself so that the beam issuing therefrom may be directed to describe a closed curve or a device which causes a reflecting mirror disposed in the path of the beam issuing from a stationary light source to be moved so that the beam may be directed to describe a closed curve.

As illustrated within FIGS. 1 and 2, the method for projecting the beam 7, La, or Lb toward the viewing volume 5 which is formed by the light detecting device 3 and the optical system 2 will be described. When the beam from a given point is projected toward the viewing volume 5, the detecting surface for the beam "La" corresponds to the line segment a' within the viewing volume 5 and the detecting surface for the beam "Lb" corresponds to the line segment b' within the viewing volume 5 as illustrated in FIG. 1. After the direction in which beam 7 is to be projected has been set as La or Lb as seen in FIG. 1, for example, the light source 4 is rotated in a circle about light axis 9 so as to form a conically configured solid surface of light. The surface thus formed is referred to as "detecting surface". The term "detecting surface", therefore, means a surface such that, when an object falls in part of the surface, the beam impinging upon that object may be reflected back into the light detecting device.

When the projection position of the beam 7, La, or Lb, namely, the light source 4, is moved along a circle 10 whose center is made to coincide with the axis 9 of the optical system 2, the projection of the beam can be obtained in four different ways. These ways will be described with the aid of the symbols of FIGS. 3(A) through 3(D). In these diagrams, $\alpha$ represents the angle of image, $\beta$ represents the angle of projection of the beam 7, (+) is the direction of the projection angle such that the beam will intersect the light axis 9, (−) is the direction of the projection angle such that the beam 7 will diverge from and not intersect the light axis 9, and "f" is the focal distance of the optical system 2.

(i) When the angle of beam projection $\beta$ satisfies the relation, $\beta \leq -(\alpha/2)$, since the detecting surface does not intersect the viewing volume, if the beam is allowed to impinge upon the object, the reflected beam will not return to the light detecting device.

(ii) As can be appreciated from FIG. 3(B), when the angle of beam projection $\beta$ satisfies the relation, $-(\alpha/2) < \beta \leq 0$, since the detecting surface intersects the periphery of the viewing volume but fails to intersect the central portion thereof, the central portion of the light detecting device fails to receive the reflected beam. The radius $r_1$ of the portion not receiving the reflected beam is expressed by the following formula:

$$r_1 = f \cdot \tan |\beta|$$

(iii) When the angle of beam projection $\beta$ satisfies the relation, $0 < \beta \leq (\alpha/2)$, there occurs a region in which the ratio of the detecting surface to the light detecting device is 2:1 as illustrated in FIG. 3(C) (indicated by a doubly hatched area in the diagram). The radius $r_2$ of this region is expressed by the following formula.

$$r_2 = f \cdot \tan \beta$$

(iv) When the angle of beam projection $\beta$ satisfies the relation, $\beta > \alpha/2$, the ratio of the detecting surface to the light detecting is 2:1 throughout the entire surface of the light detecting device as illustrated in FIG. 3(D).

As is evident from the foregoing description, the detecting surface exists in any of the cases of (ii), (iii), and (iv). When an object falls in this detecting surface, therefore, the reflected beam emanating from this object reaches the light detecting device. Since the intensity of the reflected beam emanating from the object is inversely proportional to the square of the distance traveled by the reflected beam, the ease of detection decreases with increasing distance from the object. In view of the factors described above, the case in which the angle of beam projection $\beta$ is greater than one half of the image angle $\alpha$ and the beam is projected within the image angle proves to be advantageous because of the characteristics that the surface of the light detecting device is utilized most efficiently, that the resolving power for the detection of position is highest, and that since the detecting surface has a limited area and only the reflected beam emanating from the object is allowed to enter the light detecting device, the presence or absence of an object within the detecting surface of a limited area can be checked in the ON or OFF pattern. The following embodiment will be described with respect to the operation effecting the projection of the beam by the method of (iv) described above.

Continuing with reference to FIG. 2, when the beam from the light source 4 is moved by a suitable means to describe a given closed curve (for example, a circle around the light axis as its center in the illustrated embodiment), this beam 7 forms an enveloped surface 8 (indicated by a hatched area). When the object 6 to be detected falls on this enveloped surface 8, this object 6 is irradiated with the beam 7 in accordance with the cycle of movement of the light source 4. As a result, the detecting surfaces 11a (the surface of a cone having AB as its diameter and P as its vertex minus the bottom surface) and 11b (the surface of a cone having CD as its diameter and P as its vertex minus the bottom surface) are fixed as the region which is shared by the aforementioned viewing volume 5 and the aforementioned enveloped surface 8. When the object 6 falls on the detecting surfaces 11a, 11b, this object 6 is irradiated with the beam 7 and the consequent reflected beam is received by the light detecting device 3. Thus, the detection of the object 6 is accomplished.

FIG. 4 and FIG. 5 represent an object detecting apparatus as one embodiment of the present invention. In this apparatus, the light detecting device 3 functioning as a position detecting element is disposed at the focal position of the optical system (condensing lens) 2. Behind this light detecting device, a light source 4 is disposed on the light axis 9 of the lens. As the light source, it is ideal to use a laser of the type which produces a substantially scatter-free beam. In this case, except when the apparatus is used in the total absence of external light, the laser beam is desired to be generated in a pulsating pattern so as to permit clear distinction between the reflected laser beam and the external light. A certain type of semiconductor laser is capable of generating pulses at a frequency of several MHz. Since this semiconductor laser is compact and has small power consumption, it serves ideally as the power source. In front of the light source 4, a reflecting mirror 12 is disposed on the light axis. Another reflecting mirror 13 is disposed outside the light axis. The reflecting mirrors 12, 13 assume a mutually fixed positional relationship and are supported so as to be rotated about the light axis 9 as the center. The reflecting mirror 12 receives the beam from the light source 4 and reflects it in the direction of the reflecting mirror 13 and the reflecting mirror 13 receives the reflected beam from the reflecting mirror 12 and reflects it in the direction of the light axis 9 in front of the lens 2. The reflected beam emanating from the reflecting mirror 13, therefore, intersects the light axis 9 at the point P. The reflecting mirrors 12, 13 are rotated by a motor 14 and the angles of rotation of these two mirrors are detected by a potentiometer or encoder 15.

As seen in FIGS. 4 and 5, in the construction described above, the beam from the light source 4 is projected by the reflecting mirrors 12, 13 rotated at a fixed, equal revolution number into the viewing volume 5 which is formed by the light detecting device. The detecting surface comprises the surfaces 11a, 11b of the cones having P as a common vertex and AB and CD respectively as diameters minus their bottom surfaces. These conical shapes of the surfaces 11a, 11b are determined by the focal distance "f" of the lens 2, the angle of image $\alpha$, the angle of projection $\beta$, the distance $l_1$ between the two reflecting mirrors 12, 13, and the distance $l_2$ between the plane of mirror rotation and the light detecting device 3. The vertex P of the cones corresponds to the center of the light detecting device 3 and the circumferences of the circles of diameters AB, CD correspond to the periphery of the light detecting device 3. For example, the two points S, S' indicated in FIG. 6 correspond to one and the same point on the light detecting device 3. Since the positions of the laser for beam projection are offset from each other by an angle of 180°, however, these points can be easily discerned.

Let $(x_0, y_0, z_0)$ stand for the rectangular coordinates of the detected position of the object 6, $(r, \theta)$ stand for the polar coordinates of the position of the spot on the light detecting device 3, and $\theta'$ stand for the angle of the position of laser projection, then the following equations will be established. When $\theta' = \theta$ is satisfied (wherein, $\theta$ and $\theta'$ represent angles measured from the x axis with the z axis as the axis of rotation and the direction of the rotation is so fixed that a counterclockwise rotation as viewed from the laser generator side will be designated as a positive direction):

(1)

$$x_0 = -r_0 \cdot \cos\theta$$

$$y_0 = -r_0 \cdot \sin\theta$$

$$z_0 = \{f \cdot l_1 - r \cdot (l_2 + f)\}/(f \cdot \tan\beta - r)$$

wherein $r_0 = r\{l_1 - (l_2 + f) \cdot \tan\beta\}/\{f \cdot \tan\beta - r\}$
Where $\theta' = \theta + 180°$:

(2)

$$x_0 = -r_0' \cdot \cos\theta$$

$$y_0 = -r_0' \cdot \sin\theta$$

$$z_0 = \{f \cdot l_1 + r(l_2 + f)\}/\{f \cdot \tan\beta + r\}$$

wherein $r_0' = r\{l_1 - (l_2 + f) \tan\beta\}/\{f \cdot \tan\alpha + r\}$

From the foregoing equations, the coordinates $(x_0, y_0, z_0)$ of the object 6 are found and the position of the object 6 is detected.

In the detection of the object 6, it is the case of (1), namely, the detecting surface 11b which is the surface of the cone having the diameter CD minus the bottom surface that is actually used. When the object 6 is completely contained within the cone having the diameter CD and does not touch the surface of this cone, it is theoretically undetectable. When this object 6 occurs in the bottom surface of the cone and unless this object 6 floats in the air, it ought to possess a leg 6' extended in some direction or other as shown in FIG. 7 and this leg 6' ought to touch the surface of the cone. By simply turning the light source 4 by one complete circle, there can be derived an effect the same as though the interior of the circle were scanned. Thus, the object 6 can be detected as well.

A typical case in which the object detecting apparatus described above is actually mounted on a mobile robot will be described with reference to FIG. 8. When the mobile robot 16 approaches the obstacle 6 and the vertex of the cone assumes the position of the point P, since this obstacle 6 does not fall in the detecting surface 11b, the laser beam impinging upon the obstacle 6 and reflected thereby will not enter the light detecting device 3. When the robot 16 further advances and part of the obstacle 6 comes into contact with the surface of the cone at a part other than the bottom surface thereof, namely the detecting surface, part of the reflected laser beam is received on the light detecting device 3, which consequently issues an output containing a signal of the same frequency as the projected laser beam. The information on the position of the detected obstacle can be obtained by converting the output signal into the terms $r, \theta$ and carrying out the aforementioned calculation using these terms.

The illustrated embodiment is so constructed that the projected beam is reflected by the two reflecting mirrors 12, 13 finally to be projected toward the viewing volume. Optionally, the semiconductor laser as a light source may be disposed in place of the reflecting mirror 13 and adapted to be rotated along a fixed orbit so that the beam will be projected into the viewing volume to form an enveloped surface.

Then, the beam is projected so that part of the circle of the bottom surface in the cone of the detecting region formed by the beam may intersect the ground surface as illustrated in FIG. 9. In this case, when the light source 4 is rotated by one complete circle, the reflected beam corresponding to the portion in which the cone and the ground surface 6a intersect each other reaches the light detecting device 3. Thus, the object detecting apparatus discerns the ground surface as an obstacle.

When the ground surface is flat, the value of the coordinate of the y axis becomes substantially $-Y_0$ irrespective of the value of $\theta$ of the intersected portion (FIG. 9(B)). The presence or absence of irregularity in the ground surface can be determined by making use of this relation. The condition for the absence of surface irregularity in the portion of $\theta_1 < \theta < \theta_2$ (intersected portion) is as follows:

$$Y_0 = -Y_0 \tag{3}$$

By substitution, the following equations are derived from this equation.

$$\begin{cases} r = B/\{1 + (A \sin \theta/Y_0)\} \\ A = f \tan \beta \\ B = l_1 - (f + l_2) \tan \beta \end{cases} \tag{4}$$

If the terms $(r, \theta)$ under the condition of $\theta_1 < \theta < \theta_2$ heavily deviate from the relation of the formula (4), the object detecting apparatus concludes that there exists an abrupt change in the ground level. When the robot approaches a sloped ground 6b instead of an abrupt change in the ground level as illustrated in FIG. 10, there occurs a gradual deviation from the relation of the formula (4). Depending on the change of the value of $Y_0$, the object detecting apparatus can discriminate the sloped ground from an abrupt change (step) in the ground level.

Now, a typical method by which the position of an obstacle detected by the light detecting device 3 is calculated on the basis of the reflected beam from the obstacle will be described with reference to FIG. 11.

The output signals (1), (2), (3), and (4) issuing from the four terminals of the light detecting device 3, two disposed horizontally and two vertically with respect to the center of the light detecting device 3, are amplified by an amplifier. The amplified output signals, $\bar{E}_i (i=1, 2, 3, \text{ and } 4)$, from the amplifier comprise the DC components $\bar{E}_i$ by the external light of an intensity of $\overline{W}$ and the modulated components $\bar{E}_i$ by the projected signals $\overline{W}$. The amplified signals are sent through a DC component removing filter to be deprived of the DC components $\bar{E}_i$.

The remaining modulated components $\tilde{E}_i$ which are in the form of sine waves, are converted into DC signals in an AC-DC converter. The output components obtained in consequence of conversion in the DC converter will be hereinafter referred to as $E_1$, $E_2$, $E_3$, and $E_4$. The total output signal $(E_1 + E_2 + E_3 + E_4)$ is compared with a prescribed value $\epsilon$ in the comparator. When it is found to be smaller than the prescribed value, the incoming information is judged as indicating the "absence of an obstacle". When the total output signal is found to be greater than the prescribed value and the incoming information is judged as indicating the "presence of an obstacle", the positions of the light spot on the light detecting device $(\tilde{x}, \tilde{y})$ are calculated based on the signals $E_1$ through $E_4$. When the light detecting device in use is a two-dimensional light position detecting device, for example, the relation such as is expressed by the formula (5) is satisfied. The positions $(\tilde{x}, \tilde{y})$, therefore, can be easily determined by fixing the coefficients $k_1$, $k_2$ through calibration in advance.

$$\tilde{x} = k_1 \frac{E_1 - E_2}{E_1 + E_2}, \quad \tilde{y} = k_2 \frac{E_4 - E_3}{E_4 + E_3} \tag{5}$$

Then to find the relation with the angle of beam projection $\theta'$, the orthogonal coordinates $(\tilde{x}, \tilde{y})$ are converted into the corresponding polar coordinates $(\tilde{r}, \tilde{\theta})$ and, base on the relation between the term $\theta$ and the angle of beam projection $\theta'$, the position $(x_0, y_0, z_0)$ of the object is calculated in accordance with the aforementioned formulas (1), (2).

For the object detecting apparatus to be used in an ON or OFF pattern, namely, for the purpose of determining whether any obstacle is present in or absent from the detecting surface, the light detecting device 3 in FIG. 12 is divided into two (one upper and one lower) portions 3a, 3b, so that the voltages Ea, Eb of the respective portions may be detected. In this case, an inexpensive solar battery can be used quite satisfactorily as the light detecting device. If Ea=0 and Eb≠0 are satisfied when the angle of rotation $\theta'$ of the light source 4 is in the range of $0° < \theta' < 180°$, an obstacle to be detected is present in the detecting surface 11a. If Ea≠0 and Eb=0 are satisfied under the same condition, the obstacle is present in the detecting surface 11b.

If Ea=0 and Eb≠0 are satisfied when the angle of rotation $\theta'$ is in the range of $180° < \theta' < 360°$, an object to be detected is present in the detecting surface 11b. If Ea≠0 and Eb=0 are satisfied under the same condition, then the object is present in the detecting surface 11a. In this case, Ea and Eb are assumed to be the voltages due to the modulated components resulting from the passage of output signals through the filter.

This salient advantage derived from the use of this object detecting apparatus resides in the fact that, by sacrificing the information concerning the position of the object under detection and by merely checking the output of the light detecting device to determine whether this output includes any signal of a frequency equal to the pulse frequency of projected laser beam, the presence or absence of the object in the detecting surface can be discerned without requiring any calculation. The object detecting apparatus of the present invention, therefore, can be used not only in a mobile robot but also as part of the visual system of a manipulator or the like.

FIG. 13 and FIG. 14 represent yet another embodiment of the object detecting apparatus of the present invention. The lens 2 in the lens barrel 17 is a condensing lens having a focal distance of "f". At the focal position of the lens 2, the light detecting device 3 adapted to function as a position detecting element is disposed. Outside the light axis of this lens 2, the light source 4 is disposed as attached to a rotary ring 18. The light source 4 faces the direction in which the projected beam intersects the light axis 9 at the point P. The rotary ring 18 has an annular shape and is supported rotatably by a support ring 20 through the medium of a bearing 19, and allowed to rotate around the light axis. Owing to the rotation of this rotary ring 18, the light source 4 is allowed to rotate about the light axis. The angle of rotation of the rotary ring 18 and that of the light source 4 are detected by a rotation angle meter 21 attached to the support ring 20. The rotation angle meter 21 may be replaced with an encoder. A toothed wheel 22 is disposed on the periphery of the rotary ring 18 and a pinion 23 is meshed with this toothed wheel 22. The pinion 23 is driven by a motor 24. A power source 25 for operating the light source 4 and a light intensity modulating circuit 26 are also attached to the rotary ring 18. The lens barrel 17 housing the lens 2 and the light detecting device 3, the support ring 20, and the motor 23 are supported fast on a frame 27.

The object detecting apparatus of the present embodiment is constructed as described above. This construction is very simple because the power source 25 for driving the light source 4 and the light intensity modulating circuit 26 are rotated jointly with the light source 4. By causing the output of the light detecting device to be processed in the same manner as described above, the object detecting apparatus can obtain information as to the presence or absence of the obstacle and the position thereof. The same effect is obtained by imparting a reciprocating motion of 360° to the rotary ring 18 by use of a servomotor. In this case, the power source and the light intensity modulating circuit may be connected with cords to feed electric power to the light source instead of being attached fast to the rotary ring.

For example, a semiconductor laser having a light intensity of 10 mW (780 nm of wavelength) may be used as the light source, disposed at an angle of 18° relative to the light axis, and rotated at the speed of 15°-20° rps so as to describe an arc 100 mm in radius. A standard lens having a diameter of 35 mm and a focal distance of 50 mm may be used as the optical system, with a positive sensing device disposed at the focal position of this lens.

With the object detecting apparatus constructed as described above, detection of an obstacle can be effectively performed within an area about 1.5 to 2.0 m of distance from the front side of the apparatus and about 1 m of diameter.

As is evident from the foregoing description, the object detecting apparatus contemplated by the present invention is capable of obtaining real-time information concerning the presence or absence of an obstacle and the position of the obstacle by projecting a laser beam into the viewing volume formed by the light detecting device and moving the laser beam with a given closed curve thereby enabling the reflected laser beam from the obstacle to enter the aforementioned light detecting device. Thus, it can be advantageously used as an obstacle sensor in a mobile robot.

Obviously, many modifications and variations of the present invention are possible in light of the above teachings. It is therefore to be understood that within the scope of the appended claims, the present invention may be practiced otherwise than as specifically described herein.

What is claimed is:

1. Apparatus for detecting the presence of an object within a spatial region disposed downstream of said apparatus, comprising:
    an axis extending through said spatial region within which said object to be detected is disposed;
    means for projecting a beam of light in said downstream direction into said spatial region so as to intersect said axis at a predetermined angle with respect to said axis;
    means for rotating said light beam projecting means in a circle about said axis while maintaining said predetermined angle of said projecting means with respect to said axis so as to define a conical detecting surface, within said spatial region within which said object to be detected is disposed, for illuminating said object to be detected; and
    optical means, disposed upon said axis upstream of said spatial region within which said object to be detected is disposed, for receiving light reflected from said illuminated object,
    whereby said object to be detected is capable of being detected.

2. Apparatus as set forth in claim 1, wherein:
    said means for projecting said beam of light comprises a light source disposed at said predetermined angle with respect to said axis.

3. Apparatus as set forth in claim 1, wherein said means for projecting said beam of light comprises:
    a light source fixedly disposed upon said axis;
    a first mirror disposed upon the circumference of said circle; and
    a second mirror disposed upon said axis for transmitting said light beam from said light source to said first mirror.

4. An object detecting apparatus according to claim 2 wherein the light source is a semiconductor laser.

5. Apparatus as set forth in claim 3, wherein:
    said means for rotating said light beam projecting means comprises means for rotating said first and second mirrors about said axis.

6. Apparatus as set forth in claim 2, wherein:
    said light source comprises a light emitting diode.

7. Apparatus as set forth in claim 1, wherein:
    said optical means comprises a condensing lens and a light detector.

8. Apparatus as set forth in claim 7, wherein:
    said light detector comprises a solar battery.

9. Apparatus as set forth in claim 7, wherein:
    said condensing lens and said light detector are both disposed downstream of said light beam projecting means.

10. Apparatus as set forth in claim 7, wherein:
    said condensing lens is disposed downstream of said circle within which said light beam projecting means is disposed; and
    said light detector is disposed upstream of said circle within which said light beam projecting means is disposed.

11. Apparatus as set forth in claim 7, wherein:
    said condensing lens and said light detector are both disposed upstream of said circle within which said light beam projecting means is disposed.

12. Apparatus as set forth in claim 7, wherein:
    said condensing lens is disposed in a co-planar manner with respect to said circle within which said light beam projecting means is disposed; and
    said light detector is disposed upstream of said condensing lens and said circle within which said light beam projecting means is disposed.

13. Apparatus as set forth in claim 1, wherein:
    said object detecting apparatus is mounted upon a mobile robot.

14. Apparatus for detecting the presence of an object within a spatial region disposed downstream of said apparatus, comprising:
    an axis extending through said spatial region within which said object to be detected is disposed;

means for projecting a beam of light in said downstream direction into said spatial region so as to intersect said axis at a predetermined angle with respect to said axis;

means for rotating said light beam projecting means in a circle about said axis while maintaining said predetermined angle of said projecting means with respect to said axis so as to define a conical detecting surface, within said spatial region within which said object to be detected is disposed, for illuminating said object to be detected; and optical means, disposed upon said axis upstream of said spatial region within which said object to be detected is disposed, for defining a viewing volume encompassing said conical detecting surface generated by said rotated light beam projecting means within which light reflected from said illuminated object is able to be received, whereby said object to be detected is capable of being detected.

15. Apparatus as set forth in claim 14, wherein:
said light beam projecting means comprises a light source disposed upon the periphery of said circle.

16. Apparatus as set forth in claim 15, wherein:
said light source comprises a semiconductor laser.

17. Apparatus as set forth in claim 14, wherein said light beam projecting means comprises:
a light source fixedly disposed upon said axis;
a first mirror disposed upon the circumference of said circle; and
a second mirror disposed upon said axis for transmitting said light beam from said light source to said first mirror.

18. Apparatus as set forth in claim 17, wherein:
said means for rotating said light beam projecting means comprises means for rotating said first and second mirrors about said axis.

19. Apparatus as set forth in claim 14, wherein:
said optical means comprises a condensing lens and a light detector disposed upstream of said condensing lens.

20. Apparatus as set forth in claim 14, wherein:
said object detecting apparatus is mounted upon a mobile robot.

* * * * *